United States Patent [19]

Hamano et al.

[11] Patent Number: 5,000,889

[45] Date of Patent: Mar. 19, 1991

[54] PROCESS FOR PREPARING POLYAMIDE FILM

[75] Inventors: Akito Hamano; Katsuaki Kuze, both of Otsu; Kunio Takeuchi; Maki Matsuo, both of Inuyama; Hajime Suzuki, Moriyama; Osamu Makimura, Ogaki; Eiichi Nagayasu, Inuyama, all of Japan

[73] Assignee: Toyo Boseki Kabushiki Kaisha, Osaka, Japan

[21] Appl. No.: 489,030

[22] Filed: Mar. 6, 1990

Related U.S. Application Data

[63] Continuation-in-part of Ser. No. 125,804, Nov. 23, 1987, abandoned, which is a continuation of Ser. No. 824,687, Jan. 22, 1986, abandoned.

[30] Foreign Application Priority Data

| May 22, 1984 | [JP] | Japan | 59-104066 |
| May 30, 1984 | [JP] | Japan | 59-109981 |
| May 31, 1984 | [JP] | Japan | 59-112445 |
| Jul. 24, 1984 | [JP] | Japan | 59-153420 |

[51] Int. Cl.$^5$ .............................................. B29D 7/01
[52] U.S. Cl. .................................... 264/22; 264/210.1; 264/210.6; 264/211; 425/174.8 E
[58] Field of Search ................ 264/22, 210.1, 210.6, 264/211; 425/174.8 E

[56] References Cited

U.S. PATENT DOCUMENTS

| 3,642,971 | 2/1972 | Wolfgang et al. | 264/210.6 |
| 3,898,200 | 8/1975 | Lofquist | 264/210.6 |
| 4,111,625 | 9/1978 | Remmington et al. | 425/174.8 E |
| 4,268,464 | 5/1981 | Yoshimo et al. | 425/174.8 E |
| 4,472,338 | 9/1984 | Hermann et al. | 264/210.6 |

FOREIGN PATENT DOCUMENTS

| 6142 | 6/1962 | Japan . | |
| 21949 | 6/1971 | Japan . | |
| 41371 | 4/1978 | Japan | 264/211 |
| 17559 | 2/1980 | Japan . | |
| 21258 | 2/1980 | Japan | 264/22 |

*Primary Examiner*—James Lowe
*Attorney, Agent, or Firm*—Jones, Tullar & Cooper

[57] ABSTRACT

A process for preparing a polyamide type film which comprises melt-extruding a polyamide resin having a metal compound and a melt specific resistance of not more than $1.5 \times 10^5$ Ωcm at 260° C. in a form of a film, contacting the melt-extruded film closely with a revolving cooling drum through static electricity and taking up the film while cooling rapidly to solidify, which provides remarkable improved adhesion by static electricity. As a result, increasing the take-up rate of the revolving cooling drum does not cause trapping of air between the drum and the film so that a film having excellent uniformity in thickness and transparency can be produced.

12 Claims, No Drawings

PROCESS FOR PREPARING POLYAMIDE FILM

This application is a continuation-in-part application of application Ser. No. 125,804 filed Nov. 23, 1987, now abandoned, which is a continuation application of application Ser. No. 824,687 filed Jan. 22, 1986 now abandoned.

FIELD OF THE INVENTION

The present invention relates to a process for preparing a polyamide film having excellent uniformity of thickness with high efficiency.

BACKGROUND OF THE INVENTION

A polyamide film is widely applied to the field of various wrappings which make use of its characteristics such as toughness, impact resistance, proof against pinholes, barrier property against oxygen and the like. In recent years, the demand for a polyamide film has increased with the growth of retort foods so that it is desirable to provide a film having a high quality and a low price.

Methods of preparing a polyamide film conventionally include an inflation method and a melt extrusion method by means of a T-die method.

In the case where a polyamide film is obtained by the T-die method, a molten film extruded through a die is cast onto a revolving cooling or chill drum. At this time, in order to bring the film and the revolving cooling drum into close contact, certain methods are carried out according to which air is sprayed through an air-knife (hereinafter referred to as the "air-knife method"), a charge is induced on the molten film to contact the film by static electricity (hereinafter referred to as the "electrostatic pinning method"), and the like. However, casting with such an air-knife method and electrostatic pinning method traps air between the revolving cooling drum and the film by reason of an accompanying air current which is caused by the revolutions associated with a high haul-off speed so that a uniform film can not be obtained.

The electrostatic pinning method, which is, for example, disclosed in Japanese Patent Publication No. 6142/1962, is a method wherein an electrode, for example, which is of the wire type, is inserted between a die and a cooling drum to provide a static charge for a film article, so that the film article is closely contacted onto the cooling drum with static electricity whereby uniformity of thickness and transparency of a formed film are improved. According to such a method, a molten extruded film article is closely contacted onto the cooling drum by static electricity to be cooled, and hence, there can be efficiently obtained a thermoplastic resin film.

Further, as to a polyamide resin, there is disclosed a cooling method for a polyamide type thermoplastic polymer film which is characterized by subjecting a film to corona discharge at a condition of streamer corona discharge, inducing a charge on a molten film and contacting it closely onto a revolving cooling drum with static electricity (cf. Japanese Patent Laid Open Publication No. 17559/1980). It is also known that this method is successful for a synthetic resin having a melt specific resistance of not more than $6.0 \times 10^6$ Ω cm (cf. Japanese Patent Laid Open Publication No. 105930/1981).

However, such a method has also insufficient adhesion when the angular velocity of the cooling drum is raised for increased production efficiency, so that air is trapped between a sheet and the revolving cooling drum at a partial area. At that area, the heat transfer between the cooling drum and the sheet is decreased producing inequality of cooling effect among sufficient contact areas and insufficient contact areas so that uniformity of thickness and transparency of a sheet article becomes remarkably worse thereby damaging a value of the article. Moreover, when a sheet is subsequently subjected to uniaxial or biaxial orientation, it may be impossible to produce a film or a sheet itself because of breakage of a sheet in the stretching stage.

OBJECTS OF THE INVENTION

It is the object of the present invention to provide the art with a process for preparing a polyamide resin sheet with high speed and high efficiency and without incurring damage to the uniformity of thickness and transparency known in the prior art.

SUMMARY OF THE INVENTION

According to the present invention, there is provided a process for preparing a polyamide film which comprises the steps of: dissolving a metal compound in a polyamide resin; melt-extruding the polyamide resin having the dissolved metal compound and a melt specific resistance of not more than $1.5 \times 10^5$ Ω cm at 260° C. in a form of a film, contacting the melt-extruded film closely with a revolving cooling drum through static electricity and cooling it rapidly to solidify, and a process for preparing an oriented polyamide film which comprises further stretching the resulting film at a ratio of not less than 1.1 times in at least one direction.

According to the present invention, there can be obtained with high efficiency a polyamide film having excellent uniformity of thickness and transparency.

The present invention enables a polyamide type resin to have a melt specific resistance of not more than $1.5 \times 10^5$ Ω cm at 260° C. to remarkably improve an adhesion with cooling drum based on static electricity by incorporating a suitable amount of compounds into a polyamide type resin so that there can be obtained an unoriented polyamide film and an oriented polyamide film having excellent uniformity of thickness with high efficiency.

A polyamide type resin containing no metal compound usually has a melt specific resistance at 260° C. of $1 \times 10^5$ Ω cm to $5 \times 10^5$ Ω cm for nylon 6, nylon 66 and polymetaxylyleneadipamide, and $5 \times 10^5$ to $10 \times 10^5$ Ω cm for nylon 12, which are included in a thermoplastic synthetic resin having a melt specific resistance of not more than $6.0 \times 10^5$ Ω cm disclosed in Japanese Patent Laid Open Publication No. 105930/1981. However, it has been found that a polyamide resin containing a metal compound having a melt specific resistance of not more than $1.5 \times 10^5$ Ω cm at 260° C. has remarkable increased adhesion through static electricity in comparison with a starting material polyamide having no metal compound.

DETAILED DESCRIPTION OF THE INVENTION

The polyamide type resins used in the present invention include nylon 6, nylon 66, nylon 12, polymetaxylyleneadipamide homopolymer or copolymer, and the like. In addition, there can be used a thermoplastic polyamide having an ability to form a film. These polyamide resins usually have a melt specific resistance of more than $1 \times 10^5$ Ω cm at 260° C. when they have no metal compound. These polyamide resins may be used in an admixture thereof. Further, these resins may also have a small amount of organic and inorganic compounds such as other resins, a lubricant, an anti-static agent, a colorant and the like.

The metal compounds used in the present invention include halides, oxygen acid compounds of sulfur, oxygen acid compounds of phosphorus, hydroxides, organic carboxylic acid salts, organic sulfonic acids of alkali matals, alkaline earth metals, aluminium group element, transition metals, and the like, particularly sodium chloride, lithium chloride, potassium chloride, magnesium chloride, calcium chloride, aluminium chloride, zinc chloride, copper chloride, cobalt chloride, sodium bromide, lithium bromide, magnesium bromide, potassium iodide, sodium iodide, sodium sulfate, magnesium sulfate, zinc sulfate, sodium phosphate, potassium phosphate, sodium phosphite, sodium hypophosphite, potassium hypophosphite, sodium hydroxide, lithium hydroxyde, sodium stearate, potassium stearate, potassium oleate, sodium acetate, potassium acetate, sodium benzoate, sodium laurylsulfonate, sodium benzensulfonate, ethylene ionomer, and the like. In addition to the above, there may be directly bound a metal base with a polyamide chain by incorporating a compound containing a metal base having an ability to form an amide bond such as 5-sodium sulfoisophthalate. In the present invention, there can be used any polyamide having a metal compound therein and a melt specific resistance of not more than $1.5 \times 10^5$ Ω cm at 260° C., and the metal compounds are not limited to the above. As to metals having small ionization potential such as alkali metals, alkaline earth metals and the like, there can be used a simple substance per se. These metal compounds are incorporated in an amount of 0.0005 to 10% by weight (in a metal content of 0.0003 to 3% by weight, preferably 0.0003 to 0.5% by weight) based on the weight of the polyamide resin so that the metal is dissolved in the polyamide resin, i.e., particles of the metal compound are uniformly dispersed in the polyamide resin and substantially disappeared. Thus, there can be obtained the polyamide resin having a melt specific resistance of not more than $1.5 \times 10^5$ Ω cm at 260° C. When the amount of the metal compound is less than 0.0005% by weight, it shows less improved adhesion with static electricity. When the amount of the metal compound is more than 10% by weight, it induces undesirable lower properties of the film. However the present invention is not limited by the range itself of the amount of the incorporated metal compound.

The metal compound may be incorporated by any method such as adding it into a starting monomer before polymerization, adding it during polymerization, adding it on an extraction stage, adding it during the drying of pellets. It is essential that the metal compound is contained in the resulting melt-extruded polyamide resin, and the present invention is not limited by the method for adding.

For contacting the film with a revolving cooling drum through static electricity in the present invention, it is preferable to subject the film to a corona discharge in a form of stremer corona to induce the charge (cf. Japanese Patent Laid Open Publication No. 17559/1980). However, the present invention is not limited only to such a method, and there can be employed an apparatus which disposes a usual high potential charge electrode closer to a molten film to produce charge, an apparatus for contacting by using static electricity with an air-knife, and an apparatus which induces the charge contrary to a high potential charge electrode on a revolving cooling drum by covering the revolving cooling drum with a dielectric material, and the like. The polyamide resin containing a metal compound and having a melt specific resistance of not more than $1.5 \times 10^5$ Ω cm at 260° C. has improved adhesion of molten resin by static electricity onto the cooling revolving roller of these apparatus in comparison with a polyamide resin containing no metal compound.

The take-up rate of an unoriented film in the present invention is not particularly limited. When the take-up rate is increased, a uniform unoriented film can not be obtained by trapping of air between the revolving cooling drum and the molten film. When a conventional polyamide resin containing no metal compound and having a melt specific resistance of not less than $1.5 \times 10^5$ Ω cm is taken-up onto a revolving cooling drum through an electrostatic pinning method, the maximum take-up rate is usually 10 to 20 m/minute, on the other hand, the present invention prevents trapping of air between the revolving cooling drum and the molten film at a rate of over the above maximum rate to give an unoriented film having a uniform thickness. The unoriented polyamide film per se is preferably used for the wrapping of foods. Further, the unoriented polyamide film is preferably stretched at a ratio of not less than 1.1 times in one direction, more preferably each 2.0 to 5.0 times in two directions intersected at right angles to give a biaxial oriented film so that the film is preferable for various wrapping films because of its further improved mechanical strength, transparency and oxygen barrier property. When a polyamide type resin obtained from lactam and aminocarboxylic acid such as nylon 6 is used as the polyamide of the present invention, an extraction stage for a monomer and an oligomer is required during a stage of preparing the raw material. In such case, when the polymerization is carried out after incorporation of a metal compound into a polymerization raw material, the metal compound may be partially eluted to decrease adhesion by static electricity. In such case, it is rather preferable to add a metal compound after polymerization.

The methods for incorporation of the metal compound include a method in which a metal compound is directly incorporated into a polyamide type resin in a rotary dryer and the like, a method in which other polyamides containing a metal compound are incorporated, and a method in which an ethylene type ionomer resin is incorporated. When the metal compound is directly incorporated, a stable adhesion by static electricity may not be obtained because of localizing of the metal compound, and hence, it is preferable to incorporate other polymers having a metal compound and an ethylene type ionomer resin so as to obtain uniform melt specific resistance. Alternatively, when a metal base is chemically bound with a main chain of a polyamide resin, an improved adhesion by static electricity is preferably maintained even after the extraction stage.

Among polyamide resins, a polyamide type resin having an aromatic residue has more improved adhesion by static electricity than that of an aliphatic polyamide resin. However, nylon 6 and nylon 66 have a most economical advantage so that they are widely used. It is preferable to copolymerize aromatic diamine, dicarboxylic acid or aminocarboxylic acid with nylon 6 and nylon 66 because of improved adhesion by static electricity.

The adhesion by static electricity is improved with lower melt viscosity of using polyamide. In view of the mechanical strength of a product and the operation efficiency on preparing of a film, however, melt viscosity is preferable in a range of 250 to 4000 poise at 270° C. It is more preferable that the melt viscosity be in a range of 400 to 1800 poise, but the present invention is not limited to such a range.

As is seen from the following Examples, the polyamide resin the melt specific resistance of which becomes not more than $1.5 \times 10^5$ $\Omega$ cm by incorporating the metal compound according to the present invention has remarkable improved adhesion by static electricity in comparison with that of a polyamide type resin with no metal compound, and hence, increasing the take-up rate of the revolving cooling drum does not cause trapping of air between the drum and the film, so that it produces a film having excellent uniformity in thickness and transparency.

By the use of this film, there can also be obtained uniaxial or biaxial oriented film having excellent uniform thickness and transparency.

The present invention is illustrated by the following Examples.

The melt specific resistance of the resin in the present invention was calculated by the following formula:

$$\rho(\text{specific resistance}) = (S/L) \times (V/I)$$

by using a current value after 1 to 5 seconds when a stainless steel electrode was inserted into a molten resin maintained at 260° C. to give a continuous current at 100 V. In the above formula, $\rho$ is specific resistance ($\Omega$ cm), S is area (cm$^2$) of an electrode, L is the distance between electrodes (cm), V is voltage (V), and I is current (A). In the measurement of the present Examples, S was 0.12 cm$^2$, and L was 1.5 cm. A relative viscosity of the resins in the present Examples was measured as follows:

The resin was dissolved into sulfuric acid (96.3% conc.) to give a concentration of the resin of 1.0 g/100 ml, and a relative viscosity of the resulting mixture was measured by an ostward viscosity meter in a constant temperature bath at 20° C.

A melt viscosity was measured at a temperature of 270° C. by a Khoka type flow tester under the conditions of orifice diameter, orifice length and load in such a manner as to make a shear rate of 100 to 200 sec$^{-1}$. As a sample for measurement, the resin just before the measurement of the maximum take-up rate was used. A melt viscosity was calculated by the following formula:

$$\eta = \frac{\pi a^4 P}{8LQ}$$

wherein $\eta$ (poise) is melt viscosity, a (cm) is orifice diameter, L (cm) is orifice length, P (dyne/cm$^2$) is load and A (g/sec) is output of the resin.

Each maximum take-up rate in the Examples is the maximum rate at which trapped air between a revolving cooling drum and a molten film can be prevented under the following condition: the resin was extruded in the form of a film by an extruder with a screw having a diameter of 90 mm$\phi$ through T-die at 260° to 280° C. and casted onto a revolving cooling drum at 10° to 20° C., and the resulting molten film was provided with charge from a high potential electrode and was contacted closely onto the revolving cooling drum, after which the take-up rate of the revolving cooling drum was increased gradually.

EXAMPLE 1

Into a nylon 6 pellet, which has a relative viscosity of 2.6 and contains as a slipping agent 0.4% by weight of silicon dioxide having an average particle size of 3 $\mu$ m was added a trisodium phosphate 12 hydrate in a rotary vacuum dryer in such a manner as to be contained 0.05% by weight based on the weight of the nylon 6, and the resulting resin was dried, after which the resin was extruded in a form of a film through a T-die with screw extruder having a diameter of 90 mm$\phi$ onto a drum at 20° C. In such time, trapped air was not caused between the resin and the revolving cooling drum until the maximum take-up rate of 60 m/min so that there was obtained a transparent unoriented film having less unevenness in thickness. The resin had a melt specific resistance of $5.7 \times 10^4$ $\Omega$ cm at 250° C.

EXAMPLES 2 and 3

In the same manner as described in Example 1, magnesium-bromide or zinc chloride was added in an amount in the following table and the resulting resin was subjected to casting test. Until the maximum take-up rate in the following table 1, trapped air between the resin and the revolving cooling drum was prevented

REFERENCE EXAMPLE 1

Into a nylon 6 being the same as those of Examples 1 to 3 which has a relative viscosity of 2.6 and contains 0.4% by weight of silicon dioxide having an average particle size of 3 $\mu$ m was dried in a rotary vacuum dryer without an addition of a metal compound, after which the resulting resin was subjected to casting test as same as in Example 1. At a take-up rate of 35 m/min, air was trapped between the resin and the revolving cooling drum, and unevenness in thickness and opaque points were caused. The resin had a melt specific resistance of $1.8 \times 10^5$ $\Omega$ cm.

EXAMPLE 4

A polymetaxylyleneadipamide having a relative viscosity of 2.1, which was obtained by incorporating metaxylylenediamine (440 parts by weight) and adipic acid (470 parts by weight) with trisodium phosphate 12 hydrate (1 parts by weight) and water (450 parts by weight) and subjecting to polycondensation, was extruded through T-die at 260° C. in the same manner as described in Example 1 to effect casting test. As a result, trapped air between a resin and a revolving cooling drum was not caused at a take-up rate of over 65 m/min, and unoriented film with a uniform thickness and a good transparency was obtained. The melt specific resistance of this resin was $3.9 \times 10^4$ $\Omega$ cm.

REFERENCE EXAMPLE 2

Polymetaxylyleneadipamide containing no metal compound and having a relative viscosity of 2.1 was obtained in the same manner as described in Example 4, except that trisodium phosphate 12 hydrate was not added in the polycondensation. This resin was extruded through a T-die at 260° C. in the same manner as Example 1 and subjected to the casting test. As the result, air was trapped between the resin and the revolving cooling drum at a take-up rate of 40 m/min and a scoreline pattern was found on the resulting film. The melt specific resistance of this resin was $1.6 \times 10^5$ Ω cm.

EXAMPLE 5 AND REFERENCE EXAMPLE 3

Nylon 12 pellet having a relative viscosity of 2.1 alone or the pellet mixed with 0.4% by weight of sodium stearate to dry was respectively subjected to the casting test in the same manner as Example 1. Each product was free from trapped air between the resin and the revolving cooling drum at the take-up rate up to the value shown in Table 1.

TABLE 1

|  | Base Resin | Added Metal Compound | Added Amount (wt %) | Maximum Take-up Rate (m/min) | Melt Specific Resistance ($\times 10^5$ Ωcm) |
| --- | --- | --- | --- | --- | --- |
| Ex. 1 | Nylon 6 | Trisodium Phosphate 12 Hydrate | 0.05 | 60 | 0.57 |
| Ex. 2 | Nylon 6 | Magnesium Bromide | 0.04 | 60 | 0.47 |
| Ex. 3 | Nylon 6 | Zinc Chloride | 0.03 | 55 | 0.60 |
| Ref. Ex. 1 | Nylon 6 | — | 0 | 35 | 1.8 |
| Ex. 4 | Polymetaxylylene adipamide | Trisodium Phosphate 12 Hydrate | 0.13 | ≧65 | 0.39 |
| Ref. Ex. 2 | Polymetaxylylene adipamide | — | 0 | 40 | 1.6 |
| Ex. 5 | Nylon 12 | Sodium Stearate | 0.4 | 42 | 1.1 |
| Ref. Ex. 3 | Nylon 12 | — | 0 | 30 | 6.5 |

EXAMPLE 6

Polymetaxylyleneadipamide having a melt specific resistance of $0.23 \times 10^5$ Ω cm and a relative viscosity of 2.1 was obtained by incorporation of metaxylylenediamine (440 parts by weight) and adipic acid (470 parts by weight) with trisodium phosphate 12 hydrate (5 parts by weight) and water (450 parts by weight), and subjecting to polycondensation. Then, a pellet of the above polymetaxylyleneadipamide (10 parts by weight) containing trisodium phosphate was incorporated into a pellet of polycapramide (100 parts by weight) containing 0.4% by weight of silicon dioxide having an average particle size of 3 μ m as a slipping agent and having a relative viscosity of 2.6, dried and mixed in a rotary vacuum dryer. Using the resulting pellet, the maximum take-up rate was defined. It was free from trapped air between the revolving cooling drum and the molten film at a take-up rate of up to 55 m/min. The melt specific resistance of this resin was $5.5 \times 10^4$ Ω cm.

EXAMPLE 7

(Synthesis of a polyamide resin containing a metal compound)

To nylon salt (600 parts by weight) which was obtained from adipic acid and hexamethylenediamide was added water (400 parts by weight) and stearic acid (3 parts by weight), which was subjected to polycondensation to obtain nylon 66 having a melt specific resistance of $0.14 \times 10^5$ Ω cm at 260° C. and a relative viscosity of 2.6. Then the maximum take-up rate was defined using the pellet which was obtained by adding a pellet of the above nylon 66 (6 parts by weight) containing the above sodium stearate with a pellet of polycapramide (100 parts by weight) containing 0.4% by weight of silicon dioxide having an average particle size of 3 μ m as a slipping agent and having a relative viscosity of 2.6, drying and mixing in a rotary vacuum dryer. As a result, air was not trapped between the revolving cooling drum and the molten film at the rate up to 55 m/min. The melt specific resistance of this resin was $0.54 \times 10^5$ Ω cm.

REFERENCE EXAMPLE 4

Polymetaxylyleneadipamide having a melt specific resistance of $2.2 \times 10^5$ Ω cm at 260° C. and a relative viscosity of 2.1 was obtained by incorporating metaxylylenediamine (440 parts by weight) and adipic acid (470 parts by weight) with water (450 parts by weight) and subjecting to polycondensation. Then, the maximum take-up rate was defined using a pellet which was obtained by adding the above polymetaxylyleneadipamide (10 parts by weight) with a pellet of polycapramide (100 parts by weight) containing 0.4% by weight of silicon dioxide having an average particle size of 3 μ m as a slipping agent and having a relative viscosity of 2.6, drying and mixing in a rotary vacuum dryer. As the result, air was trapped between the revolving cooling drum and the molten film at a take-up rate of 37 m/min and a scoreline pattern and some opaque portion were observed. The melt specific resistance of this resin was $2.0 \times 10^5$ Ω cm.

TABLE 2

|  | (Polycapramide) (Parts by weight) | Polyamide Containing Metallic Salt | | | | Maximum Take-up Rate (m/min) | Melt Specific Resistance ($\times 10^5$ Ωcm) |
| --- | --- | --- | --- | --- | --- | --- | --- |
|  |  | Polyamide | Added Metal Salt | Melt Specific Resistance ($\times 10^5$ Ωcm) | Parts by weight |  |  |
| Ex. 6 | 100 | Polymetaxylylene adipamide | Trisodium Phosphate | 0.23 | 10 | 55 | 0.55 |
| Ex. 7 | 100 | Nylon 66 | Sodium Stearate | 0.14 | 6 | 55 | 0.54 |
| Ref. Ex. 4 | 100 | Polymetaxylylene adipamide | — | 2.2 | 10 | 37 | 2.0 |

EXAMPLE 8

Ionomer resin (1.5 parts by weight, produced by Mitsui Polychamical KK, Trade name: Hi-miran 1605) was added to a pellet of polycapramide (100 parts by weight) containing silicon dioxide having an average particle size of 3 μm (0.4 wt %) as a slipping agent and having a relative viscosity of 2.6, dried and mixed in a rotary vacuum dryer. Using the resulting pellet, the maximum take-up rate was defined. It was free from trapped air between the revolving cooling drum and the molten film at a take-up rate of up to 59 m/min. The melt specific resistance of this resin was $5.5 \times 10^4$ Ω cm.

EXAMPLE 9

Ionomer resin (3 parts by weight, produced by Mitsui Polychamical KK, Trade name: Hi-miran 1601) was added to a pellet of nylon 12 (100 parts by weight) having a relative viscosity of 2.1, dried and mixed in a rotary vacuum dryer. Using the resulting pellet, the maximum take-up rate was defined. It was free from trapped air between the revolving cooling drum and the molten film at a take-up rate of up to 45 m/min. The melt specific resistance of this resin was $1.2 \times 10^5$ Ω cm.

EXAMPLE 10

Ring opening polymerization was carried out by adding 0.5 parts by weight of an aqueous nylon salt solution (conc. 25% by weight) from sodium sulfoisophthalate and hexamethylendiamine to obtain a pellet of nylon 6. Residual lactam was extracted with hot water to give a pellet of nylon 6 containing less than 1.0% by weight of an extractable component, having a melt specific resistance of $5.4 \times 10^4$ Ω cm at 260° C. and a relative viscosity of 2.6. The maximum take-up rate was defined by using the pellet dried and mixed in a rotary vacuum dryer. It succeeded in preventing trapped air between the revolving cooling drum and the molten film at the take-up rate of up to 57 m/min.

EXAMPLE 11

Ring opening polymerization was carried out by adding 100 parts by weight of δ-caprolactam and 5 parts by weight of an aqueous solution (conc. 25% by weight) of hexamethylenediamine salt of sodium sulfoisophthalate to obtain a pellet of nylon 6. Residual lactam was extracted with hot water to give a pellet of nylon 6 containing less than 1.0% by weight of an extractable component, having a melt specific resistance of $0.16 \times 10^5$ Ω cm at 260° C. and a relative viscosity of 2.6.

The maximum take-up rate was defined by using a pellet which was obtained by adding the above pellet (5 parts by weight) to a pellet of nylon 6 having a melt specific resistance of $1.9 \times 10^5$ Ω cm at 260° C. and a relative viscosity of 2.6 (100 parts by weight) and drying and mixing in a rotary vacuum dryer. It succeeded in preventing trapped air between the revolving cooling drum and the molten film at a take-up rate of 57 m/min. The melt specific take-up rate of this resin was $5.3 \times 10^4$ Ω cm.

EXAMPLE 12

An aqueous nylon salt solution of metaxylylenediamine (6.9 parts by weight) and adipic acid (7.4 parts by weight) in hot water (14.3 parts by weight) was added to ε-caprolactam (100 parts by weight), which was subjected to polycondensation reaction at 180°–240° C. under pressure, then at 240°–270° C. under the ambient pressure to give a pellet of a copolymerized polyamide type resin having a relative viscosity of 2.6.

The pellet was treated with hot water to extract the residual lactam. Then the maximum take-up rate was defined by using a pellet which was obtained by incorporating trisodium phosphate 12 hydrate (0.05 parts by weight) into the above pellet (100 parts by weight), mixing and drying in a rotary vacuum dryer. It succeeded in preventing trapped air between the revolving cooling drum and the molten film at the rate of up to 59 m/min. The melt specific resistance of this resin was $5.9 \times 10^4$ Ω cm.

EXAMPLE 13

An aqueous nylon salt solution of metaxylylenediamine (13.8 parts by weight) and adipic acid (14.8 parts by weight) in hot water (28.6 parts by weight) was added to ε-caprolactam (100 parts by weight), which was subjected to polycondensation reaction at 180°–240° C. under pressure, then at 240°–270° C. under the ambient pressure to give a pellet of a copolymerized polyamide resin having a relative viscosity of 2.6.

The pellet was treated with hot water to extract the residual lactam. Then the maximum take-up rate was defined by using a pellet which was obtained by incorporating trisodium phosphate 12 hydrate (0.05 parts by weight) into the above pellet (100 parts by weight), mixing and drying in a rotary vacuum dryer. It succeeded in preventing trapped air between the revolving cooling drum and the melting film at the take-up rate up to 62 m/min. The molten specific resistance of this resin was $6.1 \times 10^4$ Ω cm.

EXAMPLE 14

Trisodium phosphate 12 hydrate (1% by weight) was added to a pellet of nylon 6 having a melt viscosity of 1,400 poise and dried and mixed in a rotary vacuum dryer. The resulting pellet was extruded through a biaxial extruder to give a pellet. Further, the pellet (5 parts by weight) was added to the pellet (100 parts by weight) of nylon 6 having melt viscosity of 1,400 poise and dried and mixed in a rotary vacuum dryer, which was used to define the maximum take-up rate. As a result, trapped air between the revolving cooling drum and the molten film was prevented at the rate up to 60 m/min. The melt specific resistance of this resin was $5.7 \times 10^4$ Ω cm.

EXAMPLES 15 and 16

In the same manner as described in Example 1, except that nylon 6 having a melt viscosity of 900 and 2,500 poise was respectively used instead of the pellet of nylon 6 having a melt viscosity of 1,400, the maximum take-up rate was defined. As a result, trapped air between the revolving cooling drum and the molten film was prevented at the rate up to 65 m/min and 53 m/min. The melt specific resistance of these resins were $5.5 \times 10^4$ Ω cm and $5.9 \times 10^4$ Ω cm, respectively.

EXAMPLE 17

Unoriented films having a even thickness without trapped air between the resin and the revolving cooling drum, and unoriented film having scorelines with trapped air between the resin and the revolving cooling drum, which were obtained in Examples 1–3, 6–8, 10–16 and Reference Example 1, were respectively stretched lengthwise through a pair of rollers having a different peripheral speed at 70° C. and stretch ratio of 3.5. Then, the resulting films were stretched transversely with a tenter at 100° C. at the ratio of 3.7, and further subjected to a heat-set at 200° C. to give a film of biaxially oriented nylon 6. As a result, the unoriented films without trapped air afforded biaxially oriented films, while the unoriented films with trapped air were broken in a tenter and hardly gave the biaxially oriented film. The thicknesses of the unoriented film were 150-200 μ m, and those of the biaxially oriented films were 12-16 μ m.

TABLE 3

| | Raw Material of Resin (A) | | (A)/(B) Nylon 6 was used as (B) (ratio by weight) | Maximum Take-up Rate (m/min) | Melt Specific Resistance (×10⁵ Ωcm) |
|---|---|---|---|---|---|
| | 25 wt % Aqueous Solution of Sodium Sulfoisophthalate and Hexamethylenediamine (parts by weight) | ε-Caprolactam (parts by weight) | | | |
| Ex. 10 | 0.5 | 100 | 100/0 | 57 | 0.54 |
| Ex. 11 | 5 | 100 | 10/100 | 57 | 0.53 |

TABLE 4

Maximum take-up rate and a melt specific resistance of polyamide resin copolymerized with various aromatic compounds

| | Polyamide Resin | | Metal Compound | | Maximum Take-up Rate (m/min) | Melt Specific Resistance (×10⁵ Ωcm) |
|---|---|---|---|---|---|---|
| | Monomer | Amount (parts by weight) | | Amount (parts by weight) | | |
| Ex. 12 | ε-Caprolactam | 100 | Trisodium Phosphate 12 Hydrate | 0.05 | 59 | 0.59 |
| | Metaxylylene diamine | 0.9 | | | | |
| | Adipic Acid | 7.4 | | | | |
| Ex. 13 | ε-Caprolactam | 100 | Trisodium Phosphate 12 Hydrate | 0.05 | 62 | 0.61 |
| | Metaxylylene diamine | 13.8 | | | | |
| | Adipic Acid | 14.8 | | | | |

What is claimed is:

1. A process for preparing a polyamide type film which comprises the steps of: dissolving a metal compound in a polyamide resin; melt-extruding the polyamide resin having the dissolved metal compound and a melt specific resistance of not more than $1.5 \times 10^5$ Ω cm at 260° C. in a form of a film; contacting the melt-extruded film closely with a revolving cooling drum through static electricity; and taking up the film while cooling rapidly to solidify.

2. A process for preparing a polyamide type film according to claim 1, wherein the polyamide resin comprises a composition composed of 100 parts by weight of a polyamide resin the main repeating unit of which is capramide and 0.01 to 30 parts by weight of a polyamide resin having a metal compound and a melt specific resistance of not more than $1.0 \times 10^5$ Ω cm at 260° C.

3. A process for preparing a polyamide type film according to claim 1, wherein the polyamide resin consists of a polyamide type resin composed of 2 to 20% by weight of aromatic residue selected form aromatic aminocarboxylic acid residue, aromatic dicarboxylic acid residue and aromatic diamine residue, 98 to 80% by weight of aliphatic residue selected from aliphatic aminocarboxylic acid residue, aliphatic dicarboxylic acid residue and aliphatic diamine residue, a metal compound and a melt specific resistance of not more than $1.5 \times 10^5$ Ω cm at 260° C.

4. A process for preparing a polyamide type film according to claim 1, wherein the polyamide resin consists of a composition composed of 1 to 100 parts by weight of polyamide type resin (A) bound with a metal base on a main chain thereof and 99 to 0 parts by weight of polyamide type resin (B) having a melt specific resistance of not less than $1.5 \times 10^5$ Ω cm at 260° C.

5. A process for preparing a polyamide type film according to claim 1, wherein the polyamide resin consists of a composition which is obtained from incorporating of 0.1 to 10% by weight of an ethylene type ionomer resin into a polyamide resin.

6. A process for preparing a polyamide type film according to claim 1, wherein the polyamide resin consists of a polyamide type resin having a metal compound, a melt specific resistance of not more than $1.5 \times 10^5$ Ω cm at 260° C. and a melt viscosity of 250 to 1800 poise at 270° C.

7. A process for preparing a polyamide type film according to claim 1, which further comprises the step of stretching the resulting film at a ratio of not less than 1.1 times in at least one direction.

8. A process for preparing a polyamide type film according to claim 2, which further comprises the step of stretching the resulting film at a ratio of not less than 1.1 times in at least one direction.

9. A process for preparing a polyamide type film according to claim 3, which further comprises the step of stretching the resulting film at a ratio of not less that 1.1 times in at least one direction.

10. A process for preparing a polyamide type film according to claim 4, which further comprises the step of stretching the resulting film at a ratio of not less than 1.1 times in at least one direction.

11. A process for preparing a polyamide type film according to claim 5, which further comprises the step of stretching the resulting film at a ratio of not less than 1.1 times in at least one direction.

12. A process for preparing a polyamide type film according to claim 6, which further comprises the step of stretching the resulting film at a ratio of not less than 1.1 times in at least one direction.

* * * * *

UNITED STATES PATENT AND TRADEMARK OFFICE
CERTIFICATE OF CORRECTION

PATENT NO. : 5,000,889

DATED : March 19, 1991

INVENTOR(S) : Akito Hamano et al

It is certified that error appears in the above-identified patent and that said Letters Patent is hereby corrected as shown below:

Claim 1, column 11, line 45, the "." should be deleted.

Claim 6, column 12, line 42, the "." should be deleted.

Claim 9, column 12, line 54, "that" should be "than".

Signed and Sealed this

Fifteenth Day of September, 1992

*Attest:*

DOUGLAS B. COMER

*Attesting Officer*     *Acting Commissioner of Patents and Trademarks*